Aug. 11, 1953

W. O. LYTLE 2,648,754

ELECTROCONDUCTIVE ARTICLE

Filed July 22, 1947

INVENTOR.
WILLIAM O. LYTLE
BY Olen E. Bee
ATTORNEY.

Aug. 11, 1953 W. O. LYTLE 2,648,754
ELECTROCONDUCTIVE ARTICLE
Filed July 22, 1947 3 Sheets-Sheet 2

Inventor
WILLIAM O. LYTLE

By Olen E. Bee
Attorney

Aug. 11, 1953  W. O. LYTLE  2,648,754
ELECTROCONDUCTIVE ARTICLE
Filed July 22, 1947  3 Sheets-Sheet 3
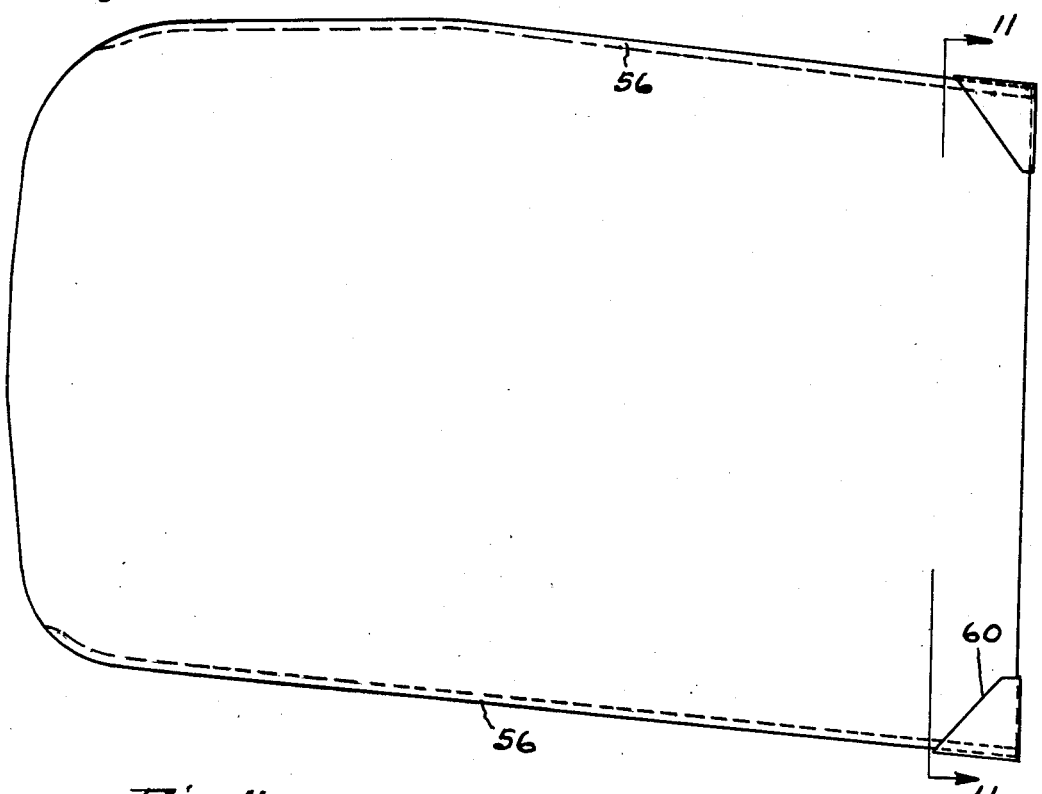
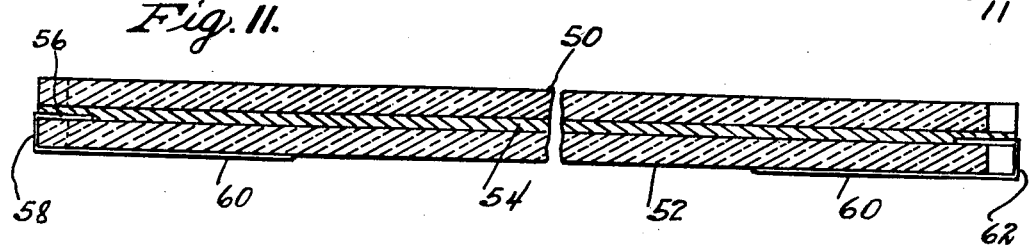
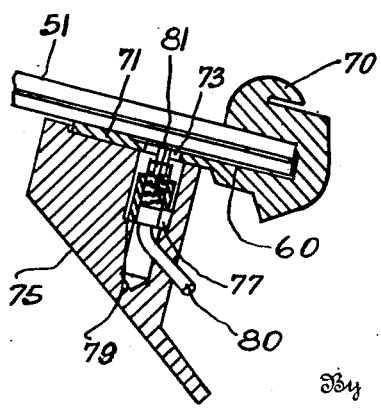
Inventor
WILLIAM O. LYTLE
By Olen E. Bee
Attorney Patented Aug. 11, 1953

2,648,754

UNITED STATES PATENT OFFICE 2,648,754

ELECTROCONDUCTIVE ARTICLE

William O. Lytle, New Kensington, Pa., assignor to Pittsburgh Plate Glass Co., Allegheny County, Pa., a corporation of Pennsylvania Application July 22, 1947, Serial No. 762,659

36 Claims. (Cl. 219—19)

This invention relates to a novel transparent glass article which is provided with a transparent electroconductive coating or film. It particularly relates to such articles in which the transparent coating comprises a metal oxide such as tin oxide. Generally these coatings are extremely thin being less than the wave length of visible light, usually of the order of 25 to 600 millimicrons.

In the uses contemplated herein for such articles, the articles are provided with electrical connections or bus bars to permit flow of electric current through the coating or a portion thereof. Several problems have been encountered in the provision of such bus bars or contacts. In the first place, difficulty has been encountered in the establishment of good electrical contact between the bus bar and the conductive metal oxide coating. Moreover, the heat, which is developed in the glass during passage of current thru the coating, creates stresses in the glass and in the coating which may become so high as to cause fracture of or damage to the glass and/or the coating. I have found that these problems may be minimized greatly by use of proper bus bars and by recourse to the other features of this invention as hereinafter disclosed.

According to this invention, I have found that superior conductivity is established and a minimum of stress developed during heating, by use of thin bus bars which comprise a strip of a vitreous glass-like conductive coating which preferably is applied by fusion or glazing to the glass and/or the coating. This conductive bus bar should have a conductivity at least 10–20 times and preferably 100 or more times that of the transparent coating and in general metal or metallized coatings are preferred.

The construction of transparent glass having such transparent coatings and bus bars has required development of special methods which have been provided in accordance with this invention. It is necessary to apply the bus bars and the conductive coating to the glass in a manner such that no serious damage to the conductivity or other property of the conductive coating occurs during application of the film and vice versa. Furthermore, the manner of depositing the bus bar must be capable of providing a bus bar which is adherent and which has good electrical contact with the coating.

In one suitable embodiment of this invention, an opaque or at least translucent conductive strip is applied, for use as a bus bar, to a glass base such as a glass sheet and the transparent conductive coating, such as a tin oxide coating, is deposited upon the glass and the strip. With conductive strips of certain composition such as metallic copper, deposition of this transparent coating frequently is accompanied by serious loss of conductivity of the bus bar due to oxidation of the metal bus bar and/or to other causes. I have found that satisfactory bus bars may be obtained using silver or gold metal coatings.

In accordance with this invention I have also found that the thickness of the bus bar bears a material relationship to the stress which is developed during passage of current through the conductive coating of an article of the type herein described. Thus I have found that such stresses may be held to a minimum by use of adherent bus bars which have a thickness less than about 0.005 inch and preferably below about 0.003 inch. Moreover, in order to minimize the stress which is developed during heating, it is advantageous that the bus bars be placed not more than about 0.2 inch from and preferably immediately adjacent to or on the face of the edge of the sheet. This is particularly true when the coated article comprises a conductive sheet, plate or panel of substantial size such as would be suitable for use as a windshield or viewing closure in the body of a vehicle.

Because of certain characteristics of the tin oxide film, certain problems arise in establishing electrical contact between the bus bar and the coating. For example, if the bus bar is applied after coating of the conducting oxide film has been completed, only metallizing compositions which dry in air or at low temperature can be used. Such compositions adhere too poorly and are too readily scraped off in subsequent handling to be satisfactory to most purposes. On the other hand, application of a fused or glazed metallic coating requires baking at temperatures which impair the electrical conductivity of the oxide film.

I have found that these difficulties may be most satisfactorily overcome by applying the bus bar to the glass base before the final coating operation and then applying the transparent tin oxide or similar metal oxide coating to the base and the bus bar. This may be accomplished by applying the bus bars to the glass base before the oxide coating is applied and thereafter applying the tin oxide or similar coating. In such a case the bus bar frequently is reenforced with an external metallizing coat after application of the tin oxide or similar films.

If two or more oxide coatings are to be applied, the bus bars are even more advantageously applied after at least one of the coatings has been deposited. In such a case the second, or at least the last, coating is deposited after the bus bars have been placed.

In applying the coating or coatings the glass base is heated above about 900° F. usually 1000 to 1250° F. and the heated base is sprayed with stannic chloride or similar agent as hereinafter described. Thus application of a plurality of coatings involves the steps of heating, spraying, reheating, spraying, etc.

I have made the surprising discovery that, despite the fact that heating above about 500° F. normally impairs the conductivity of the coating, application of the coating as a plurality of layers by a plurality of heating and spraying steps produces a film or coating which has even better overall conductivity than that produced by a single operation. Moreover I have found that excellent electrical contact is established between the bus bars and the coating when the bus bars are laid down between a pair of coating steps.

In any event, the product obtained by depositing the bus bars on the glass before the first coating or between a pair of coating operations is more firmly bonded to the glass base and is less easily damaged in subsequent handling.

The amount of tin oxide or similar coating which is deposited upon the bus bar in such an operation frequently is slight and may even be undetectable by usual methods. This is particularly true when silver is used as the bus bar material. Nevertheless, sufficient electrical contact is established between the tin oxide film and the bus bars to permit use of the resulting product. Whenever the bus bar is referred to in the claims as being deposited between the glass and a coating or deposited between a pair of coatings these terms are intended to include bus bars deposited before deposition of a final transparent conductive coating regardless of whether a coating on top of the bus bar can or cannot be detected.

Accomplishment of the foregoing constitutes some of the principal objects of the present invention and the manner by which these and other objects of the invention are attained will be more fully understood by reference to the ensuing description taken with the accompanying drawings in which:

Fig. 10 is a plan view drawn substantially to scale of another laminated panel suitable for use as a windshield;

Fig. 11 is a sectional view taken along lines 11—11 of Fig. 10; and

Fig. 12 is a fragmentary view partially in section and diagrammatically illustrating the manner by which electrical contact is made with the panel of Fig. 10 when this panel is mounted in an automotive vehicle.

Figure 1:
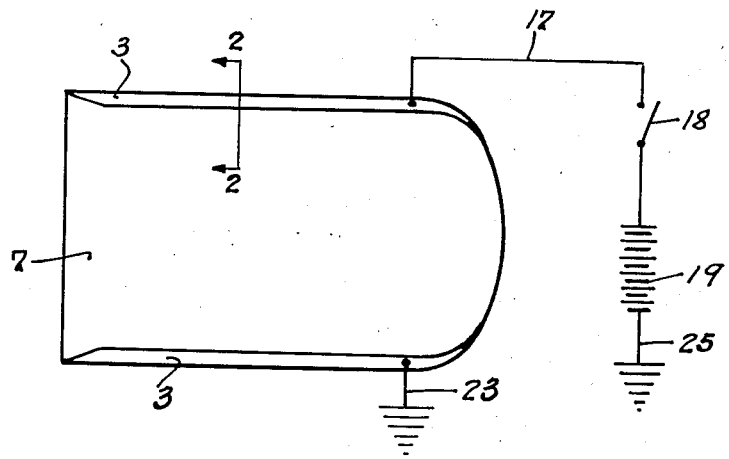
Fig. 1 is a diagrammatic plan view of a glass panel, suitable for use as a windshield of an automobile; embodying the present invention.
Figure 2:
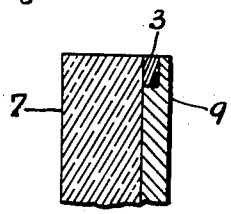
Fig. 2 is a diagrammatic fragmentary sectional view taken along lines 2—2 of Fig. 1.

In the drawings, Figs. 1 and 2 diagrammatically illustrate a heating panel constructed according to the invention and having the wiring diagrammatically illustrated. This panel comprises a glass sheet of generally rectangular shape having bus bars or conductive edge strips 3 of ceramic silver composition along opposite sides and close to the edges (preferably within 0.2 inch of the edge) of the sheet. These bus bars are disposed along the margins adjacent to the longest pair of opposite edges of the panel whereby the distance between the bus bars is held to a minimum. Alternatively they may be disposed on the edges of the panel.

The panel is provided with an electroconductive transparent film 9 of tin oxide or other material such as is described hereinafter. The bus bars are connected to a source of potential 19 by means of conductors 17, 23 and 25, one side of the potential source and one of the bus bars being grounded through conductors 25 and 23 respectively. The conductor 17 is provided with a suitable switch 18 for interrupting the flow of electric current to the film.

When the circuit is closed, electric current passes through the electroconductive transparent film and heat is generated by virtue of the resistance of the film. Usually it is desirable to limit the temperature to prevent establishment of an average temperature above about 350° F. in order to avoid damage to or loss of conductivity of the film. Where a safety glass type of assemblage (comprising a pair of glass sheets cemented together by a plastic, one of the glass sheets having a conductive coating) is used, the permissible temperature is lower and the temperature in such a case should not be permitted to rise above about 160–170° F.

In accordance with a suitable method of preparing a heating panel of the type illustrated in Figs. 1 and 2, a glass sheet 7 usually of window or plate glass is provided with conducting metal strips 3 suitable for bus bars on the margins adjacent to the edges thereof and a conducting transparent coating 9. As previously stated, these metal strips should adhere firmly to the glass sheet and should have total conductivity, not less than 10 to 20 times that of the conductive coating 9. In the preferred embodiment these metallized strips are produced by applying a metallized coating strip, usually 0.1 to 1 inch wide, upon the surface of the sheet to be treated and close to a pair of opposite edges thereof. This metallized coating must be capable of withstanding the temperatures and oxidizing conditions of treatment, and therefore should be of a ceramic or vitreous character and further should be capable of glazing or otherwise forming an adherent, well-bonded coating to the glass. In general these compositions comprise a highly conductive metal powder and a vitrifying binder. Typical ceramic conductive coating materials which may be used may have the following composition:

*Composition No. 1*

| | Per cent by weight |
|---|---|
| PbO | 7.5 |
| $B_2O_3$ | 1.0 |
| $SiO_2$ | 1.5 |
| Flake silver | 70.0 |
| French fat oil | 12.5 |
| Turpentine | 7.5 |

*Composition No. 2*

| | Per cent by weight |
|---|---|
| Finely divided silver | 72.6 |
| PbO | 9.3 |
| $SiO_2$ | 1.7 |
| $B_2O_3$ | 1.4 |
| Water | 7.5 |
| Ethyl alcohol | 7.5 |

In order to avoid production of bus bars which will develop in use excessive stresses in the glass, the thickness of the coating to be applied should not exceed about 0.005 inch and preferably should be below about 0.003 inch.

After application of the metal bus bars to the glass sheet by painting or other method, the sheet is heated to the temperature at which the binder is vitrified and application of the conductive coating may be effected, for example, above about 600 to 800° F. but below the fusion point of the glass, usually 1,050 to 1,350° F. During this heating operation the ceramic metal coating becomes glazed and is baked onto the glass so that a firm bond between the glass and the metal coating is established.

When the glass has been heated to a temperature above 800° F., for example 1050 to 1250° F., it is withdrawn from the heating chamber and immediately is sprayed with the coating solution before substantial cooling of the glass sheet can take place. A typical solution which may be used for establishing the conductive coating herein desired consists of 100 parts by weight of fused $SnCl_4 \cdot 5H_2O$, 10 parts by weight of water and 2.5 parts by weight of phenyl hydrazine hydrochloride. A quantity of this solution is placed in an atomizing spray gun and the heated glass sheet is sprayed with an atomized spray of this material for a brief period usually of the order of 2 to 20 seconds depending upon the thickness of film to be produced, the air pressure imposed upon the atomizing spray gun, etc.

As a consequence of this spraying operation a transparent conductive coating 9 is disposed upon the glass. This coating is shown in the drawing to extend over the surface of the bus bar. Frequently however the amount of film which is deposited upon the bus bar per se is so small as to be detectable only with difficulty if at all. The resistance of such coatings is found to be quite low being less than 500 ohms per unit square. The expression of the resistivity of the film in terms of resistance per unit square is a convenient means of expressing the resistance of thin films; this resistance in fact being the specific resistivity of the film divided by the average thickness of the film within the unit square.

The film thus obtained also has an unusually low haze factor being below about 5% as measured by a method designated "A tentative method of industry for transparent plastics by photoelectric cell," described in the publication "A. S. T. M. Standards," 1944, part 3, pages 1653–5, American Society Testing Materials, New York. Applicant has found that at least one of the causes of haze appears to be premature decomposition of the stannic chloride or other hydrolyzable compound which is used to deposit the conductive coating. Thus applicant has determined that unless the conversion of the stannic chloride or similar compound to the corresponding metal oxide occurs immediately adjacent to or on the hot glass surface, minute particles of tin oxide or hydrated tin oxide tend to be formed in an opaque condition and to be swept onto the glass surface and entrapped by the depositing film. Avoidance of a high degree of haze may be attained by making certain that the atomized stannic chloride spray is impinged at high speed upon the glass surface.

Avoidance of haze may also be minimized by proper co-adjustment of the distance between the nozzle of the spray gun and the glass surface with the air pressure on the spray gun. Moreover, provision of means for rapid removal of the fog which is formed by the spraying operation and which is spaced from the plate to be treated, frequently assists to prevent or minimize haze. Certain agents which may serve as reducing agents or catalysts, such as methanol, cooperate with the stannic chloride to produce a product of low haze and low resistivity. To some degree at least these agents appear to function to minimize predecomposition. Further discussion of methods of avoidance or minimizing of haze appears to be unnecessary in the present application since these features are not of absolute essentiality insofar as the claims which are presented herein are concerned.

Figure 3:
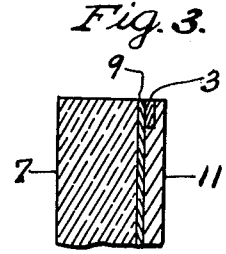
Figs. 3, 4 and 5 are diagrammatic sectional fragmentary views corresponding to Fig. 2 and illustrating various embodiments of the invention which may be utilized in lieu of the embodiment illustrated in Fig. 2.

In accordance with a further embodiment, such as illustrated in Fig. 3, the glass base 7 may be provided with two or more conductive coatings 9, 11, etc. In such a case it has been found to be more advantageous to deposit the first tin oxide coating upon the glass base and then to deposit the metallized bus bar followed by deposition of the second tin oxide or similar conductive coating. In this embodiment, the bus bars are disposed between a pair of coatings. In either case however the bus bar is disposed between the glass base and the transparent conductive coating.

Figure 4:
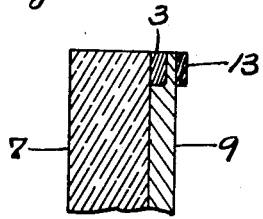
Figure 5:
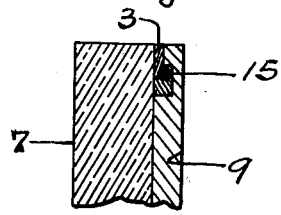
Figure 6:
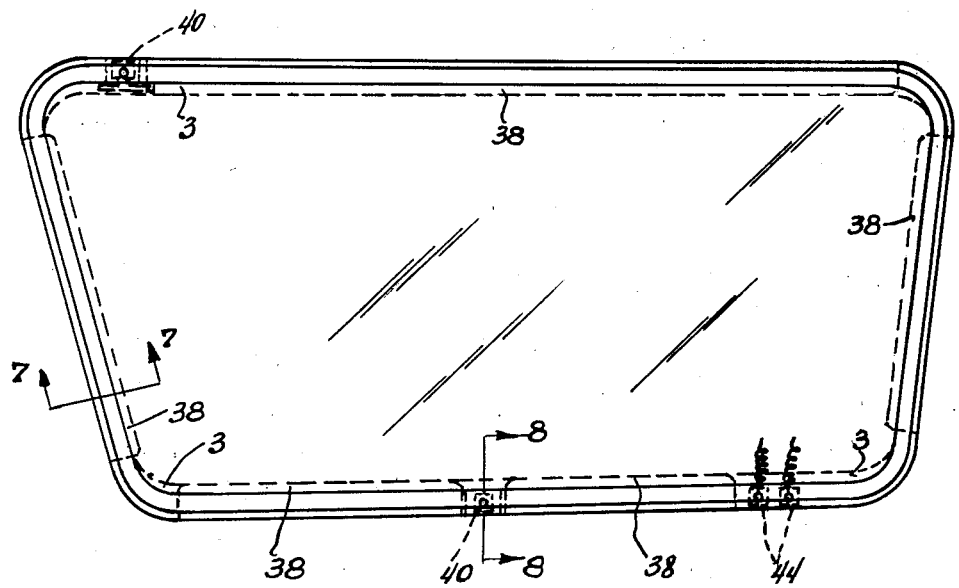
Fig. 6 is a plan view, drawn substantially to scale, of a typical laminated safety glass panel suitable for use in the cabins of aircraft and having an electroconductive transparent coating on the surface of one of the glass sheets thereof.
Figure 7:
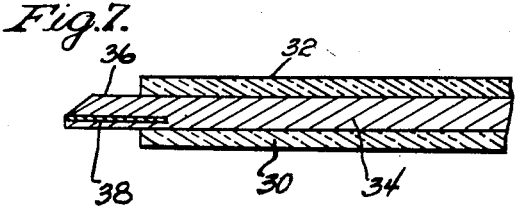
Fig. 7 is a fragmentary sectional view taken along lines 7—7 of Fig. 6.
Figure 8:
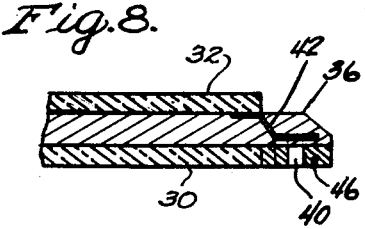
Fig. 8 is a fragmentary sectional view taken along lines 8—8 of Fig. 6.
Figure 9:
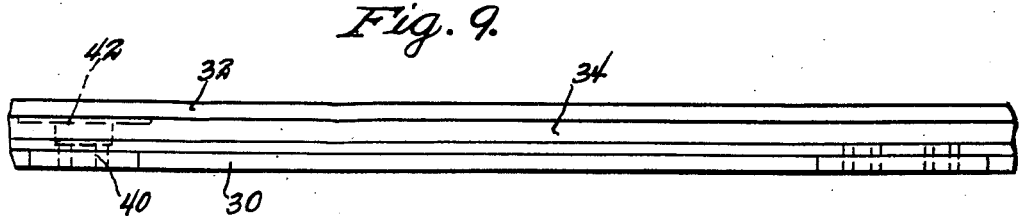
Fig. 9 is a fragmentary view of an edge of the laminated panel of Fig. 6 showing the terminals along the lower edge of the panel.

The invention herein also contemplates other embodiments. Typical additional embodiments are illustrated in Figs. 4 and 5. As illustrated in Fig. 4, it is frequently desirable to reinforce the ceramic metal bus bar with an additional metal coating after deposition of the conductive transparent film. This is particularly true where the transparent film is deposited as a single coat although this embodiment is applicable even when a multiplicity of coatings are used. Thus a glass base 7 may be provided with bus bars 3 and a transparent tin oxide coating 9 and thereafter a reinforcing coating 13 of a conductive metal paint or paste such as an air drying cement comprising a conductive metal powder, such as silver, copper, gold, etc. and an air drying binder (linseed oil, air curing resins, etc.) may be deposited upon the bus bar or the coating over the bus bar. Furthermore a reinforcing layer of copper, silver or other conductive metal may be deposited by other means such as by electrodeposition, cathode sputtering, dipping, spraying, etc. This reenforcement very substantially improves the conductivity and electrical contact between the bus bar and the conductive transparent coating.

Fig. 5 illustrates an embodiment which is particularly adapted for the establishment of superior electrical contact between the bus bar and the coating. I have found that, when silver is used as the bus bar material, the deposition of the conductive tin oxide or similar coating appears to be hindered and a tendency exists for the coating to be substantially thinner immediately adjacent to the silver bus bar. This reluctance of the conductive film to deposit adjacent to the silver frequently results in the establishment of localized areas having an unusually high resistance immediately adjacent to the bus bar.

According to the present invention, it has been found that when gold is used as the bus bar material this difficulty is not encountered and consequently the substitution of gold for silver sometimes is resorted to. However, in order to conserve the amount of gold used, applicant has found that an advantageous avoidance of the thinning out of the coating may be attained by the use of a very narrow coating of gold along the inner edge of the bus bar. As shown in Fig. 5 a glass base 7 is provided with the usual silver metal bus bar 3 and a narrow strip 15 of gold is deposited along the inner edge of the bus bar 3 and which may extend inward and overlap or cover the edge of the bus bar 3. Thereafter the transparent coating 9 is deposited in the usual manner, the coating being in contact with the gold strip 15 rather than the bar 3.

In Figs. 2 to 5 inclusive the tin oxide or similar electroconductive transparent coatings 9 and 11 are shown as thinning out over the bus bars 3. This showing is purely diagrammatic. As previously noted only a slight amount of tin oxide tends to deposit upon the bus bar itself. Often a clearly detectable deposit of the oxide coating on the bus bar may be observed. In other cases the deposit may be so slight as to be unobservable.

The structures herein contemplated have been found to be highly suitable for installation as windshields or viewing closures in the vehicle bodies of airplanes, automobiles, railway vehicles, etc. and the passage of electrical current through the conductive film maintains the film at an elevated temperature sufficiently high to minimize or prevent deposition of snow or ice or fog upon the viewing closure or windshield. The magnitude of electrical potential which should be established across the bus bars in order to remove the fog, snow and/or ice will vary largely with the conditions of operation and will depend to a very great degree upon the external temperature and also upon the velocity of air flowing over the shield or closure.

Figs. 6 to 9 inclusive (Fig. 6 of which is drawn substantially to scale) illustrate an embodiment of this invention which is especially adapted for use as a viewing closure or window in the cabin of an airplane. The panel therein shown comprises a pair of glass sheets 30, 32 which are bonded together with an interlayer 34 of a transparent, tough, flexible, elastic, rubberlike compressible essentially waterproof adherent plastic such as polyvinyl butyral, cellulose nitrate, cellulose acetate, or other convenient interlayer including other vinyl acetals and other vinyl polymers such as vinyl acetal, vinyl acetate, styrene, etc. Since this interlayer is larger in longitudinal and lateral dimensions than the glass sheets 30 and 32, the interlayer extends outward from the edges of the glass sheets to provide a peripheral rim or margin 36. This rim may be reenforced by aluminum strips 38 (Fig. 7) which are embedded therein. This general structure and the manner of mounting the panel in the cabin of an airplane is described more fully in United States Letters Patent No. 2,293,656, granted to T. H. McClain.

Glass sheet 32 is provided with a transparent electroconductive coating (not shown) on its inner side which is in contact with the plastic interlayer. This sheet is generally of the structure illustrated in Figs. 1 to 5 inclusive and is provided with silver bus bars 3 extending along opposite edges thereof. These bus bars are tapered at each end and have the external contour of the glass sheet. They extend substantially completely around the curved corners of the sheet and the taper terminates in a point substantially where the edge of the sheet ceases to be curved.

Frequently, sheets 30 and 32 may be partially tempered to reduce possibility of fracture in use. Often the sheet having the electroconductive coating is tempered to a degree less than that in the uncoated sheet 30. For example, the uncoated sheet may be tempered to about one half of full temper and the sheet 32 tempered to about ¼ to ⅓ of full temper.

Terminals 40, 40 which are in electrical connection with each bus bar are embedded in the rim portion 36 of the interlayer and extend partially therethru. These terminals are tapped to accommodate a screw for connection to a conduit attached to a source of potential. The terminals are each connected to a respective bus bar by means of a connector 42 of copper or similar conductive material which is soldered to the embedded end of the terminal and also to the bus bar (see Figs. 8 and 9).

If desired, a similar pair of spaced conductive terminals 44 of copper or the like are embedded in the interlayer rim on one side of the safety glass panel and spaced from the terminal 40.

All of the terminals 40 and 44 are located in unreenforced portions of the interlayer rim 36 and project outwardly from the interlayer a short distance generally sufficient to be essentially flush with the outer surface of the glass sheet 30. The outer end of each terminal is surrounded with a protective ring 46 of polyvinyl acetal or similar material.

In the use of this panel, the panel is mounted in an airplane cabin in the conventional manner and the terminals 40 are connected to a suitable potential source. When a potential is established across the bus bars 3 electric current passes through the electroconductive transparent film heating the film and preventing or at least minimizing formation of fog and/or ice on the surface of the panel. To prevent damage to the film the temperature of the film and the plastic is prevented from exceeding about 160° to 170° F.

Figs. 10 and 11 illustrate a panel adapted especially for an automobile. These drawings illustrate a safety glass panel 51 comprising a pair of glass sheets 50 and 52 cemented together by a plastic interlayer 54 such as polyvinyl butyral. The inner surface of sheet 52 is provided with a transparent electroconductive coating and a pair of bus bars 56 in contact with the coating and running along opposite edges of the sheet.

Thus, the interlayer is in direct contact with the electroconductive coating.

Suitable means for applying potential between the bus bars and across the film are provided at the corners of the panel. In the embodiment shown in Figs. 10 and 11 a portion of the edge and outer surface (usually located at a corner of the panel) is coated with a conductive coating such as a ceramic silver coating similar in composition to that of the bus bars. This conductive edge 62 and outer conductive coating 60 is continuous (or substantially so) with the coating comprising the bus bar and the outer conductive coating presents an electroconductive surface having substantially greater width (usually two or more times) than the width of the bus bar. This affords a good contact surface for establishing electrical contact with a potential source and establishment and maintenance of the potential across the bus bars.

The manner in which electrical contact is made with the panel of Fig. 10 is illustrated in Fig. 12. This figure is a fragmentary view showing an end of the panel 51 as is mounted in a soft rubber or other insulating channel 70 which extends completely around the periphery of the panel. This channel is provided with an elongated lip portion 71 which extends along the lower margin of the inner surface panel and which bears against the supporting surface of the cowl 75 to support the windshield and to insulate the cowl from the panel. The lip 71 has an aperture 73 which exposes a small portion of the metallized coating 60. A tubular conduit 77 which has a ledge 79 extends through the cowl and mates with the aperture 73. Electrical contact is established by an electrical conductor 80 which extends through the conduit 77 and terminates in a spring contact 81. This contact is held in place and is supported by the ledge 79. Its conductive end bears resiliently against the conductive face 60 by virtue of the contact spring as will be fully understood by those skilled in the art.

The invention and novel features heretofore described may be varied to a considerable degree without departure from the spirit of the present invention. As an example various types of ceramic metallizing compositions may be used for production of the bus bars. Such compositions may comprise a finely divided highly conductive metal disposed in a binder which is capable of establishing adhesion to the glass base and/or the coating and which is also capable of resisting heat and decomposition at 900 to 1500° F. For most purposes it is found desirable to utilize a vitrifying flux or binder which is capable of forming a glass or glass-like product upon fusion or heating to high temperature. Thus, aqueous suspensions or dispersions of hydrated colloidal silica, sodium silicate or other alkali metal silicate, or alkali metal or beryllium metaphosphates or metaborates, boron oxides, borosilicate forming compositions including lead borosilicate compositions, etc. are suitable for this purpose. Various other vitrifying glass forming adhesive compositions which are capable of withstanding heating at 900 to 1200° F. also are capable of use. Furthermore, strips or foils of metal may be bonded by a glaze or vitrifying binder for use as a bus bar.

Although the invention has been described particularly with reference to the use of silver or gold compositions dispersions of other electroconductive metals including platinum, palladium, indium, irridium, rhodium, tungsten, etc. preferably having a resistivity below $1 \times 10^{-5}$ ohm centimeters which resist oxidation may be used.

Furthermore, these ceramic bus bars may be reinforced or even replaced by a coating of a conductive metal including the conductive metals above mentioned, copper, zinc, graphite, etc.

The bus bars at all events should be many times more conductive than the transparent films in order to prevent or avoid establishment of an undue amount of hot spots. For most purposes the total resistance of each bus bar between the input contact and the furthest end from the input contact should be not more than 1 to 5 percent of the resistance of the transparent coating between the bus bars.

While the invention has been described with particular reference to the use of an aqueous solution of stannic chloride including phenyl hydrazine, it is not so limited. Aqueous solutions and nonaqueous mixtures containing stannic chloride and other reducing agents or at least agents capable of effecting reducing reactions at temperature above 500° F., usually in the proportions of a trace to three or four moles of the agent per mole of stannic chloride, may be used with success. The exact function of the reducing agent is not definitely known. The agent appears to function at least partially to minimize or delay decomposition of the stannic chloride until the stannic chloride strikes the surface of the glass. Generally speaking, reducing agents which are capable of reducing tetravalent tin to the stannous state or to free tin may be used and in general such reducing agents will have an oxidation-reduction potential higher than minus 0.13 volt as indicated on the Latimer and Hildebrand table of oxidation-reduction potentials on pages 1357 and 1358 of the Handbook of Chemistry and Physics, 28th ed., published in 1944 by the Chemical Rubber Publishing Company:

When an aqueous solution of stannic chloride is used, some difficulty may be encountered with certain reducing agents due to the fact that a precipitate may tend to form in the solution and such precipitation may tend to cause haze or even formation of an opaque film. Consequently, when aqueous solutions are used it is desirable to utilize a reducing agent which does not effect its solution reduction at room temperature. This problem is not so acute when stannic chloride vapor is used since in such a case vapors of the reducing agent and the stannic chloride are mixed in the nozzle of the spray gun and atomized together before a high degree of reaction can occur. In such a case, by high speed impingement of the reducing agent and stannic chloride vapor against the glass surface, the predecomposition of the stannic chloride and consequently haze formation will be avoided.

Some of the solutions which have been tested are as follows:

1. 90% by weight $SnCl_4.5H_2O$,
   10% by weight formaldehyde aqueous solution (containing 40% formaldehyde).

2. 900 grams $SnCl_4.5H_2O$,
   21 grams phenyl hydrazine,
   90 milliliters methanol.

3. 900 grams $SnCl_4.5H_2O$,
   21 grams phenyl hydrazine,
   30 grams of 10% sulfonated organic wetting agent such as sodium lauryl sulphate
   60 milliliters methanol.

Non-carbonaceous reducing agents including hydroxyl amine, hydrazine, thionyl chloride and gaseous hydrogen also may be used for this purpose.

The production of transparent films can be accomplished using other compounds of tin in lieu of stannic chloride or in mixtures with stannic chloride. For example conductive films may be obtained using methanol or ethanol solutions of stannous oxalate, stannous chloride, stannous acetate, stannous bromide, etc. Moreover mixtures of stannic chloride and one of these stannous salts may be used.

In accordance with a further modification of the invention conductive transparent or opaque metal oxide films prepared from hydrolyzable compounds of other metals may be used. For example cadmium salts such as cadmium chloride, cadmium acetate, cadmium bromide or cadmium formate may be dissolved in a solvent such as water or methanol and the solution sprayed onto hot glass as herein described. Such a process produces a glass article having a cadmium oxide conductive film.

Electroconductive films also may be produced using compounds of other metals such as the chlorides, bromides, acetates, or nitrates of gold, thallium, indium, lanthanum, lead, magnesium, molybdenum, selenium, strontium, tungsten, etc. Furthermore certain of these metals may be deposited in elemental state by a vapor deposition or sputtering process to produce a transparent electroconductive film or such films may be oxidized to the oxide to produce films suitable for use in the present invention.

The invention is particularly concerned with the articles comprising window glass coated with the transparent conductive coatings described herein. Such glass frequently is termed lime soda glass. Typical lime soda glass has the composition:

| | Per cent by weight |
|---|---|
| $Na_2O$ | 10 to 15 |
| $CaO$ | 5 to 15 |
| $SiO_2$ | 70 to 75 |
| $MgO$ | 2 to 10 |

A typical lime soda glass used as window glass has the following composition:

| | |
|---|---|
| $SiO_2$ | 71.38 percent by weight (usual variation 71 to 73% by weight). |
| $Na_2O$ | 12.79 percent by weight (usual variation 12 to 14% by weight). |
| $CaO$ | 9.67 percent by weight (usual variation 8 to 11% by weight). |
| $MgO$ | 4.33 percent by weight. |
| $Na_2SO_4$ | 0.75 percent by weight. |
| $NaCl$ | 0.12 percent by weight. |
| $Fe_2O_3$ | 0.15 percent by weight. |
| $Al_2O_3$ | 0.81 percent by weight. |

The invention is applicable to other transparent or opaque glassy products such as borosilicate glass, barium crown glass, quarty, china, porcelain, mica, phosphate glass, lead X-ray glass, silicon carbide and various other refractory nonmetallic materials.

The collar characteristics of the coating are determined to a substantial degree by the thickness of the coating. Colorless coatings may be obtained by use of tin oxide or similar coatings which are below about 75 to 100 millimicrons in thickness. Thicker coatings having a thickness of about 75 to 500 microns possess a color depending upon the exact thickness. This color is due to the reflection of certain bands of light at particular coating thicknesses whereby interference colors are produced. Where the thickness of the coating is irregular, different colors will be reflected at different areas of the coating and iridescence is produced. This iridescence is objectionable from the standpoint of appearance I have been able to produce transparent thin oxide coatings having a thickness above 500 millimicrons in thickness. Such coatings are essentially colorless and are more advantageous in that they have better appearance and superior conductance and uniformity of conductance.

According to one embodiment of this invention, I have found that the iridescence which is present in conductive coatings having thicknesses of the order of 50 to 600 millimicrons may be minimized or even eliminated by deposition of a further coating which is transparent and which has substantially the same index of refraction for example, within 5 percent of the index of refraction of the coating. The thickness of such further coating should be sufficient to make the total thickness of both coatings above 600 millimicrons. Alternatively the tin oxide or similar conductive coating may be deposited on a glass base which has an index of refraction equal or substantially equal to that of the deposited tin oxide or similar film. As an illustration, tin oxide coated on lime-soda window glass (which has a refractive index of about 1.52) deposited as described herein has an index of refraction of about 2.0. By depositing a transparent film of a synthetic resin or glass having an index of refraction of about 2.0, on the tin oxide surface, it is possible to obtain a coated glass article which is transparent and which has no interference colors or iridescence. For example, the glass base having a transparent tin oxide film which is thin enough to exhibit interference colors may be coated with tellurium oxide (TeO) preferably as a thin coating of the order of 100–600 millimicrons depending upon the thickness of the tin oxide coating whereby a transparent coating which is free from interference coatings is obtained. This may be done by applying a spray of a tellurium salt to the heated base, much in the manner that the tin oxide coating is applied. Moreover, application of thin coatings of zirconium orthosilicate or neodynium molybdate to the coated base tends to eliminate or minimize interference colors, and to produce a transparent base.

Elimination or minimizing of interference colors also may be effected by use of a glass base having a refractive index of substantially 2 or by applying a transparent coating having this refractive index to the glass base and applying the tin oxide coating to the coated or uncoated side of the base. Where oxides other than tin oxide are used as the conductive coating, it will be understood that the glass base and/or auxiliary coating may be selected to conform to the refractive index of the conductive coating, where avoidance or reduction of light interference effects is desired.

The articles herein described are capable of numerous uses in addition to use as a vehicle closure. For example, they may be used in space heaters as a heating element therefor. Furthermore various glass or ceramic vessels may be provided with a conductive tin oxide coating or similar coating and the coating used to heat the vessel by passage of electric current therethru. Coffee pots, glass or ceramic baking dishes, distilling flasks, etc. may be so coated and heated. The following examples are illustrative of the methods available for deposition of an electroconductive coating for use according to the invention:

Example I

Using a solution containing 100 parts by weight of fused $SnCl_4.5H_2O$, 10 parts by weight $H_2O$ and 2.5 parts by weight phenyl hydrazine hydrochloride, 5 milliliters of the solution is introduced through a thistle tube into an atomizer of the spray gun type connected to an outlet supplying air under 50 pounds per square inch pressure. A glass plate 5/64 inch in thickness and six inches square is placed on a rack having an inclined support which in turn rests on a conveyor. The plate is heated at 1150° F. in an electric furnace for two minutes, fifteen seconds, being then quickly withdrawn and immediately sprayed with the entire contents of the thistle tube, the spraying requiring a trifle less than three seconds. The distance from the spray nozzle to the plate is kept constant at a value between one and two feet. After spraying the entire area of the plate, it is allowed to cool in air until it can be handled after which it is washed with distilled water and polished with a dry cloth. The average resistivity of six plates coated under conditions identical to those above is 371 ohms per square unit of surface area and the average haze percentage measured by the A. S. T. M. method described above is 1.3.

For purposes of comparison with the prior art, plates of the same thickness and dimensions were treated under identical conditions excepting that the coating fluid employed contained 100 parts fused $SnCl_4.5H_2O$, 1.67 parts $H_2O$ and no reducing agent. With seven plates so treated the average resistivity was 907 ohms per square unit of surface area and the average haze percentage 1.1.

When plates are coated with more than one application of the coating fluid containing phenylhydrazine hydrochloride or another equivalent reducing agent according to my invention, the resistivity of the film is further diminished considerably while the average haze percentage is not increased to an objectionable point. For instance, when two coatings of 5 ml. each were applied to plates in the manner described above in connection with Example I the average resistivity of the plates was reduced to 132 ohms per squar unit of surface area while the average haze percentage increased only to 2.1, a quite acceptable figure.

On the other hand, when the coating fluid is of the Littleton type in which no reducing agent is incorporated, 5 coatings of 5 ml. each were required to bring the resistivity down to 575 ohms with the result that the haze percentage was increased to 10.1. This is greatly in excess of an acceptable figure for closures glazed for viewing purposes. Occasionally, better results can be obtained when higher furnace temperatures are resorted to. However these temperatures are too high for practical use with commercial plate or window glass.

Example II

In a series of tests, polished plate glass sheets 4 inches by 8 inches by 7/64 inch were heated for 2¼ minutes at a furnace temperature of 1250° F. Stannic chloride solutions were made up using the agents listed below in the proportion of 10 milliliters of the agent to 5 milliliters of fused stannic chloride pentahydrate. 15 milliliters of each mixture was sprayed upon the heated glass plates using an atomizing spray and a noncorrodible nozzle and the plates were allowed to cool. Average resistances of the coatings were as follows:

| Agent | Resistance, Ohms per unit square | Appearance |
|---|---|---|
| Methanol | 100 to 200 | clear. |
| Ethanol | 150 to 300 | Do. |
| n-Propanol | 160 to 300 | Do. |
| Isopropanol | 75 to 150 | slight haze. |
| Isobutanol | 100 to 300 | clear. |
| Isoamyl alcohol | 150 to 300 | Do. |
| Methyl amyl carbinol | 100 to 200 | Do. |
| Cyclohexanol | 200 to 400 | slight haze. |
| Cellosolve | 150 to 300 | clear. |
| Butyl Carbitol | 150 to 300 | Do. |
| Cellosolve acetate | 110 to 300 | slight haze. |
| Carbitol acetate | 250 to 350 | Do. |
| Methylene dichloride | 100 to 250 | clear. |
| Ethylene chlorohydrin | 300 to 1000 | Do. |
| Dipentene | 140 to 250 | Do. |
| Thionyl chloride | 100 to 150 | Do. |
| Hydroxyl amine | 100 to 150 | Do. |

Other agents including the following produced coatings, when used according to the process of Example III, which had resistances of 50 to 400 ohms per unit square:

Diacetonyl alcohol
Diethyl ketone
Methyl isobutyl ketone
Cyclohexanone
Methyl acetate
Ethyl acetate
Butyl acetate
Butyl butyrate
Amyl acetate
Nitro methane
1-nitropropane
Formic acid
Methyl amyl acetate
Ethyl ether
Triamyl amine
Butyl ether
Cellosolve acetate
Carbitol acetate
Methyl Cellosolve acetate
Propylene glycol Somewhat higher resistances are obtained using agents such as:

Acetic anhydride
Glacial acetic acid
t-Butyl perbenzoate

Solid precipitates are formed when stannic chloride is reacted with agents such as furfuryl alcohol, isophorone, dipentene or monomethyl amine or other alkyl amines. These precipitates may be rubbed on glass plates heated to 1200° F. and a clear electroconductive coating can be produced.

Example III

An aqueous solution comprising 4 grams of stannous acetate, 30 milliliters of anhydrous methanol and enough aqueous 12 normal HCl solution to cause the stannous acetate to dissolve, was prepared. This solution was allowed to stand or age in air overnight. 5 milliliters of the aged solution was sprayed in 5 seconds from an atomizing nozzle at an air pressure of 30 p. s. i. and the spray directed against a glass sheet 3 inches by 4 inches by 7/64 inch which had been subjected to a furnace temperature of 1250° F. for 2¼ minutes. Upon removal of surface powder by brushing the treated sheet after cooling, a very clear adherent essentially colorless coating was found to be present on the glass. This coating was approximately 50 to 75 millimicrons in thickness. Its conductivity was 650 to 700 ohms per unit square.

Example IV

A battery of three "De Vilbiss Spray" guns capable of spraying an atomized spray of oval cross section were mounted in a row so that their nozzles were directed substantially in a horizontal plane toward a focal point and so that the major axis of the spray was vertical. The two outer guns were directed so that the angle between the nozzles was approximately 30 degrees. The middle gun was mounted so that the nozzle was directed toward the focal point of the outer nozzles and approximately bisected the angle between the two outer nozzles. Each of the nozzles was mounted so that the end of the nozzle was approximately 11 inches from the glass.

A sheet of glass, 17 inches by 25 inches by 7/64 inch, was heated in a furnace chamber at a furnace temperature of 1150° F. for 3 minutes. The two outer guns were filled with a solution prepared by mixing the following components in the proportions specified:

| | |
|---|---|
| Stannic chloride pentahydrate_____grams__ | 900 |
| Methanol _____milliliters__ | 63 |
| Phenyl hydrazine _____grams__ | 21 |
| Dioctyl sodium sulfosuccinate solution _____milliliters__ | 30 |

The dioctyl sodium sulfosuccinate solution was prepared by mixing:

| | |
|---|---|
| Dioctyl sodium sulfosuccinate_____grams__ | 10 |
| Methanol _____milliliters__ | 45 |
| Water _____do____ | 45 |

Spray guns were turned on; the air pressure imposed in the two outer guns being 80–90 pounds per square inch and in the middle gun 80–90 pounds per square inch. The middle gun was left empty. In consequence the spray from the two outer guns impinged and caused the spray to fan out in a vertical direction whereby a relatively narrow high speed stream of spray of rectangular cross section was produced. This stream was blown forward by the blast of air from the middle nozzle.

Immediately after the heating period, the glass sheet was held vertically with its front face perpendicular to the middle nozzle and was moved across the spray so that the guns were directed at a point midway between the top and bottom edges of the sheet. The sheet was held approximately 4 inches from the focal point. Under these conditions a long thin band of spray was blown against the hot glass surface forming a coating as the sheet moved across the spray.

The air blast from the middle nozzle caused rapid movement of the spray toward the sheet whereby conversion of stannic chloride to tin oxide before the spray struck the sheet was substantially minimized. Furthermore the air blast created a draft across the sheet toward the side edges thereof thus minimizing opportunity for fog created by the spray from contacting the sheet and rapidly removing excess and partially decomposed spraying solution from the surface of the sheet. This process substantially minimized haze.

The rate of moving the sheet across the spray was such as to require approximately 6 seconds. During this period approximately 20 cc. of solution was sprayed from each gun. Following the spraying operation, the sheet was tempered to a temper of approximately one fourth that of full temper.

The resulting sheet had a transparent irridescent tin oxide coating which had a resistivity of approximately 125 ohms per unit square. The thickness of the coating was approximately 350 to 400 millimicrons.

*Example V*

A glass plate, six inches square and 7/64 inch thickness of plate glass having the following composition:

| | Per cent by weight |
|---|---|
| $SiO_2$ | 71.52 |
| $Na_2O$ | 13.02 |
| CaO | 11.62 |
| MgO | 2.52 |
| $NaSO_4$ | 0.76 |
| NaCl | 0.12 |
| $Fe_2O_3$ | 0.11 |
| $Al_2O_3$ | 0.33 | was heated on a hot plate until the under surface of the plate was at a temperature of 600° C. Heating at this temperature was continued throughout the process.

Approximately 100 cubic centimeters of stannic chloride was placed in a receptacle having a volume of about 500 cubic centimeters and the stannic chloride was heated to 105° C. Approximately 100 cubic centimeters of anhydrous methanol was placed in a 500 cubic-centimeter flask and heated to 50° C. A stream of dry air was passed over the heated stannic chloride at a rate of 30 cubic centimeters of air per second and a separate stream of dry air was placed over the heated ethanol at a rate of 3 cubic centimeters per second. These air streams, which were slightly below saturation as to their respective vapors, were mixed and the mixture was allowed to flow directly through a quarter inch pipe which was directed downward toward the upper surface of the heated plate (which was horizontally disposed) at one end of the plate and at an angle of about 30 degrees from the horizontal and in the direction of the opposite end of the plate. A suction was applied at the opposite end of the plate. By this means the mixture of air, stannic chloride and alcohol was distributed laterally of the nozzle and caused to flow across the plate. The effect of the suction is to remove tin oxide and similar compounds which are produced at points spaced from the glass surface and thereby to minimize haze formation.

The flow of air and stannic chloride and alcohol vapor was continued for 60 seconds during which the vapor mixture flowed over the hot glass plate and a transparent tin oxide coating which exhibited interference colors was found. Upon cooling, the glass was found to have a conductive transparent film therein which was in thickness of $540 \times 10^{-7}$ centimeters. This coating had a specific resistance of about $2 \times 10^{-3}$ ohm centimeters.

When this process was repeated omitting the alcohol, a glass plate having a coating which had a specific resistance of about $10 \times 10^{-3}$ ohm centimeters was obtained.

*Example VI*

The process of Example V was repeated using several other liquids in lieu of methanol using the conditions of Example V except as otherwise specified in the following table:

| Agent used in lieu of anhydrous methanol | Temperature of agent, ° C. | Ratio of air flow over $SnCl_4$ to air flow over agent | Time of treatment, seconds |
|---|---|---|---|
| Acetone | 50 | 10 to 1 | 60 |
| Benzene [1] | 65 | ___do___ | 60 |
| Carbon Tetrachloride | 65 | ___do___ | 60 |
| Acetylene [2] | 25 | 2 to 1 | 60 |

[1] Nitrogen used in lieu of air.
[2] Nitrogen used in lieu of air and the mixture comprised approximately 50 parts by volume each of acetylene and nitrogen.

Example VII

The process of Example II was repeated using the following spraying solutions and conditions and with the tabulated results:

| | Solution Composition | Amount of Solution, Milliliters | Time of Spray, Seconds | Air Pressure, p.s.i. | Resistance per Unit Square (ohms) |
|---|---|---|---|---|---|
| A | 1 part by volume of Saturated Water Solution of cadmium acetate. 1.5 parts by volume of 30% aqueous solution of $H_2O_2$. | 20 | 15 | 40 | 15 |
| B | Solution A+glyoxal | 20 | 15 | 40 | 15 |
| C | Solution A+hydroquinone | 20 | 15 | 40 | 15 |
| D | Solution A+hexamethylene tetramine | 20 | 15 | 40 | 15 |
| E | Solution A+Dinitro phenyl hydrazine | 20 | 15 | 40 | 15 |
| F | 1 part by volume of a solution comprising 75 grams of $CdBr_2 10H_2O$ and 100 grams of water. 1.5 parts by volume of 30% aqueous $H_2O_2$. | 6 | 3 | 20 | 300 |

In the above tests, the products produced were found to have a transparent coating which had conductivity substantial to that of the product of Example V.

Although the present invention has been described with reference to the specific details of certain embodiments thereof, it is not intended that such details shall be regarded as limitations upon the scope of the invention except insofar as included in the accompanying claims. This application is a continuation-in-part of my application No. 669,535, filed May 14, 1946, entitled "Transparent Conducting Films," which issued January 22, 1952, as Patent No. 2,583,000. This application also contains subject matter common with that disclosed in applicant's copending applications Serial No. 762,658, filed July 22, 1947, and Serial No. 100,961, filed June 23, 1949, the former of which has matured into Patent No. 2,614,944, dated October 21, 1952.

What is claimed:

1. An electroconductive viewing closure which comprises a transparent glass base, a transparent electroconductive metal oxide coating on the base and a bus bar having a thickness not in excess of 0.005 inch adherently bonded to the coated base and in electrical contact with the coating; the surface conductivity of said bus bar being substantially higher than the surface conductivity of the metal oxide coating.

2. An electroconductive article which comprises a transparent glass base, a transparent electroconductive metal oxide coating on the base and a bus bar having a thickness not in excess of 0.003 inch adherently bonded to the coated base and in electrical contact with the coating; the surface conductivity of said bus bars being substantially higher than the surface conductivity of the metal oxide coating.

3. An electroconductive article which comprises a glass base, a transparent electroconductive coating on the base and a bus bar along one side of the coating, said bus bar having an end which tapers longitudinally to a point adjacent the edge of the base.

4. An electroconductive article which comprises a transparent glass base, a transparent electroconductive metal oxide coating on the base and a ceramic gold coating, comprising gold particles bonded together and to the base by a silica glass binder, in electrical contact with the transparent coating and serving as a bus bar, said bus bar having a surface conductivity substantially higher than that of the metal oxide coating.

5. An electroconductive article which comprises a transparent glass base, a transparent electroconductive metal oxide coating comprising tin oxide on the base, a ceramic silver coating, comprising silver particles bonded together and to the base by a silica glass binder, between the transparent coating and the base and bonded thereto and serving as a bus bar; said bus bar having a thickness not in excess of 0.005 inch and having a surface conductivity substantially in excess of the surface conductivity of the metal oxide coating.

6. A method of preparing an electroconductive article which comprises coating a glass base with a pair of spaced electrically conducting strips comprising a vitrifying binder and an electroconductive metal and heating the base to a temperature at which the binder becomes vitrified and coating the heated base and strips with a transparent electroconductive metal oxide coating.

7. A method of preparing an electroconductive article which comprises applying a coating of a transparent electroconductive metal oxide to a base, bonding a pair of spaced electrically conducting bus bars to the coated base, heating the base above about 900° F. and applying a thin coating of an hydrolyzable metal compound to the coated base and the bus bars.

8. A method of preparing an electroconductive article which comprises applying a coating of a transparent electroconductive metal oxide to a base, bonding a pair of spaced electrically conducting bus bars to the coated base, heating the base above about 900° F. and applying a thin coating of stannic chloride to the coated base and the bus bars.

9. A method of preparing an electroconductive article which comprises applying a coating of a transparent electroconductive metal oxide to a base, bonding a pair of spaced electrically conducting bus bars to the coated base, heating the base to above about 900° F. and applying a transparent electroconductive metal oxide coating to the coated base and the bus bars.

10. A closure for a window which comprises a sheet of transparent window glass, a transparent adherent electrically conductive tin oxide coating having a specific resistance below about 0.005 ohm centimeters on the sheet and extending across a substantial area thereof, metal bus bars having a thickness less than about 0.005 inch extending along a pair of opposite edges of the sheet and in electrical contact with the coating; the conductivity of the bus bar per unit square being at least 10 times the conductivity per unit square of the oxide coating.

11. An electroconductive article which comprises a glass base, a transparent electroconductive metal oxide coating on the glass base, and a pair of spaced bus bars comprising electroconductive particles bonded together and to the glass by a fused silica glass binder in electrical contact with the coating, said bus bars having surface conductivity substantially in excess of that of the metal oxide coating.

12. A transparent heating panel which comprises a glass base, an electroconductive metal oxide coating on one side of the base, and a pair of spaced bus bars comprising electroconductive particles bonded together and to the glass by a fused silica glass binder in electrical contact with the coating, said bus bars having a thickness not in excess of 0.005 inch and having a surface conductivity substantially in excess of the surface conductivity of the metal oxide coating.

13. An electroconductive article which comprises a glass sheet having a curved edge portion adjacent a corner thereof, a transparent electroconductive coating on the sheet, and a bus bar extending along an edge including said curved corner portion, said bus bar terminating adjacent the curved corner and being tapered to a point at the end thereof.

14. An electroconductive article which comprises a transparent refractory sheet, a transparent electroconductive coating thereon, a pair of spaced metal bus bars extending along opposite sides of the sheet and in electrical contact with the coating, a transparent glass sheet bonded to the coated surface of the refractory sheet by a transparent plastic, and an electroconductive coating bonded to the refractory at the end of a bus bar and extending around the edge from the bus bar to the opposite side of the refractory sheet and an insulating channel around the edge of the article and said channel having a lip covering said metal coating.

15. The article of claim 14 wherein the lip has an aperture capable of accommodating an electrical conductor.

16. An electroconductive article which comprises a glass base, a transparent electroconductive coating on the base, a pair of spaced bus bars comprising electroconductive silver particles bonded together and bonded to the base by a vitreous binder, a strip comprising gold particles bonded together by a vitreous binder along the edge of the bus bar and in electrical contact with the bus bar and the coating.

17. An electroconductive article which comprises a glass sheet having a curved edge portion adjacent a corner thereof, a transparent electroconductive coating on the sheet, bus bars extending along opposite edges of the sheet one of said bus bars extending along said corner portion and terminating adjacent the curved corner and being tapered to a point at the end thereof said bus bars being less than 0.005 inch in thickness and comprising electroconductive particles bonded together and to the sheet by a vitreous binder.

18. An electroconductive article which comprises a glass sheet having a transparent electroconductive film thereon, a transparent reinforcing plastic sheet bonded to and extending outward beyond an edge of the glass and film to provide a plastic margin, a terminal embedded in the plastic margin, and a connector establishing electrical contact between the film and the terminal.

19. The article of claim 11 wherein the electroconductive coating is of tin oxide.

20. The article of claim 1 wherein the electroconductive coating is of tin oxide.

21. The article of claim 4 wherein the metal oxide is tin oxide.

22. An electroconductive article which comprises a transparent refractory base, an electroconductive metal oxide coating on the base, bus bars bonded to the base in electrical contact with the coating, said bus bars comprising a layer of electroconductive particles bonded together and to the refractory base by a vitreous binder, and a conductive metal coating comprising metal particles bonded together and to the layer by an air-drying cement on said layer.

23. A method of preparing an electroconductive article which comprises coating a glass base with a pair of spaced electroconductive strips comprising a vitrifying binder and electroconductive metal particles, heating the base to vitrify the binder, applying to the base a transparent electroconductive metal oxide coating, and reinforcing electrical contact between the coating and the strips by coating the strips with a further electroconductive metal coating.

24. An electroconductive article which comprises a transparent base, an electroconductive metal oxide coating on the base, a bus bar comprising conductive metal particles bonded together and to the metal oxide coating by a vitreous binder, and a second transparent metal oxide coating on the base and in electrical contact with the bus bar.

25. The article of claim 24 in which the first named metal oxide coating is tin oxide.

26. A transparent electroconductive article which comprises a transparent base, and a plurality of superimposed electroconductive coatings of electroconductive metal oxide on the base, the total combined thickness of said superimposed electroconductive coatings being within the range of from 50 to about 600 millimicrons.

27. The article of claim 26 wherein the metal oxide is tin oxide.

28. A transparent heating panel which comprises a transparent glass base, a plurality of superimposed transparent electroconductive metal oxide coatings on the base, and a metal bus bar disposed intermediate a pair of the metal oxide coatings.

29. A viewing closure which comprises a pair of glass sheets bonded together by a transparent reinforcing plastic sheet, said sheets having inner faces which are adjacent and in contact with the plastic, a transparent electroconductive metal oxide coating on the inner face of at least one of the glass sheets, and a pair of spaced metal bus bars, each one of said bus bars being adjacent one of a pair of opposed edges of the glass sheet and in electrical contact with the metal oxide coating.

30. The closure of claim 29 wherein the bus bars are less than 0.005 inch in thickness.

31. A laminated, transparent closure, comprising: inner and outer layers of glass bonded to an interlayer of transparent plastic material having a peripheral margin protruding laterally outwardly of the glass layers and of low specific cohesivity and relatively high brittleness at relatively low temperatures; means for electrically heating the closure disposed on the inner face of the outer layer of glass and extending from one margin thereof to another; means operatively connected with the first-said means for conducting electrical current heatingly through the first-said means; and a reinforcing member disposed in each of the marginal edges of said interlayer and having its inner portion lying in lateral overlap with and close thickness-wise adjacency to, the first-said means and extending outwardly therefrom substantially to the outer edge of each of the marginal portions; said heating means serving to maintain the closure clear of water-obscurations and prevent excessively low temperatures of said marginal portion, and said reinforcing members serving to strengthen said marginal portion against structural failure.

32. A laminated, transparent closure, comprising: inner and outer layers of glass bonded to an interlayer of transparent plastic material having a peripheral margin protruding laterally of the glass layers and composed of a material apt to become brittle at low temperatures, a transparent layer of electrically-conductive resistance heating material disposed on the inner face of the outer layer of glass and extending from one margin thereof to another in contact with said interlayer; current-conducting means extending in lengthwise contact with the opposed edges of said electrically conductive layer; and a substantially rigid, shear-resisting reinforcing plate disposed in each of the marginal edges of said interlayer and having its inner portion lying in close lateral and thicknesswise adjacency to said transparent layer and extending outwardly therefrom substantially to the outer edge of each of the marginal portions; said heating means serving to maintain said outer glass layer at a temperature sufficient to prevent the retention of water-form deposits thereon and to maintain the marginal portions of said plastic-material at a temperature sufficient to prevent disintegration thereof at relatively low ambient temperatures, and said reinforcing members serving to strengthen said marginal portions against structural failure.

33. A laminated panel which comprises a pair of glass sheets bonded together by a transparent plastic interlayer having a peripheral margin extending outwardly from the edges of the glass; means for electrically heating the panel disposed on the inner face of one of said sheets and intermediate the sheet and the interlayer; and a reinforcing member disposed in the margin of the interlayer.

34. The panel of claim 33, wherein the reinforcing member lies in lateral overlap with respect to the heating means.

35. A laminated panel which comprises a pair of glass sheets bonded together by a transparent plastic interlayer having a peripheral margin extending outwardly from the edges of the glass; a transparent electroconductive film on the inner face of one of said glass sheets and bonded to the plastic interlayer; and reinforcing members disposed in the peripheral margin of the interlayer and overlapping the adjacent edges of the electroconductive film.

36. A panel as in claim 35, wherein said reinforcing members are metal strips which extend outwardly from the edge of the glass toward the edge of the plastic interlayer.

WILLIAM O. LYTLE.

References Cited in the file of this patent

UNITED STATES PATENTS

| Number | Name | Date |
| --- | --- | --- |
| 1,977,625 | Ernst | Oct. 23, 1934 |
| 2,021,661 | Kisfaludy | Nov. 19, 1935 |
| 2,119,680 | Long | June 7, 1938 |
| 2,293,656 | McClain | Aug. 18, 1942 |
| 2,419,537 | Christensen | Apr. 29, 1947 |
| 2,429,420 | McMaster | Oct. 21, 1947 |
| 2,475,379 | Stong | July 5, 1949 |
| 2,513,993 | Burton | July 4, 1950 |